United States Patent [19]

Ashton et al.

[11] Patent Number: 4,776,996
[45] Date of Patent: Oct. 11, 1988

[54] PROCESS AND APPARATUS FOR FORMING HOLLOW STRUCTURES FROM POWDERED THERMOPLASTIC MATERIALS

[75] Inventors: Larry Ashton, Provo; Roland J. Christensen, Fayette; Randy L. Crane, West Jordan, all of Utah

[73] Assignee: Fiber Technology Corporation, Provo, Utah

[21] Appl. No.: 641,498

[22] Filed: Aug. 16, 1984

[51] Int. Cl.$^4$ ............................................. B29C 41/08
[52] U.S. Cl. .................................. 264/40.1; 264/255; 264/308; 264/309; 425/471
[58] Field of Search ............... 264/310, 308, 40.1, 264/309, 255

[56] References Cited

U.S. PATENT DOCUMENTS

| | | | |
|---|---|---|---|
| 3,009,209 | 11/1961 | Weinbrenner et al. | 264/310 |
| 3,186,600 | 6/1965 | Guignard | 264/310 |
| 3,379,591 | 4/1968 | Bradley | 264/310 |
| 3,744,951 | 7/1973 | Szatkowski | 264/310 |
| 4,107,244 | 8/1978 | Ochiai et al. | 264/40.1 |
| 4,308,225 | 12/1981 | Magarian | 264/257 |
| 4,687,531 | 8/1987 | Potoczky | 156/245 |

Primary Examiner—James Derrington
Attorney, Agent, or Firm—Spensley Horn Jubas & Lubitz

[57] ABSTRACT

A process is disclosed for forming a thermoplastic structure on the exterior surface of the heated mold form. A mold is heated to approximately two times the melting temperature of a thermoplastic material and particulate thermoplastic material then sprinkled onto the exterior surface of the heated mold. An adhesively bondable material may then be added to the semi-molten thermoplastic material structure. The mold is then cooled and the resulting thermoplastic structure removed.

An apparatus for practicing the above process comprising a mold form, heating system, and particulate thermoplastic material dispensing system is also disclosed.

3 Claims, 2 Drawing Sheets

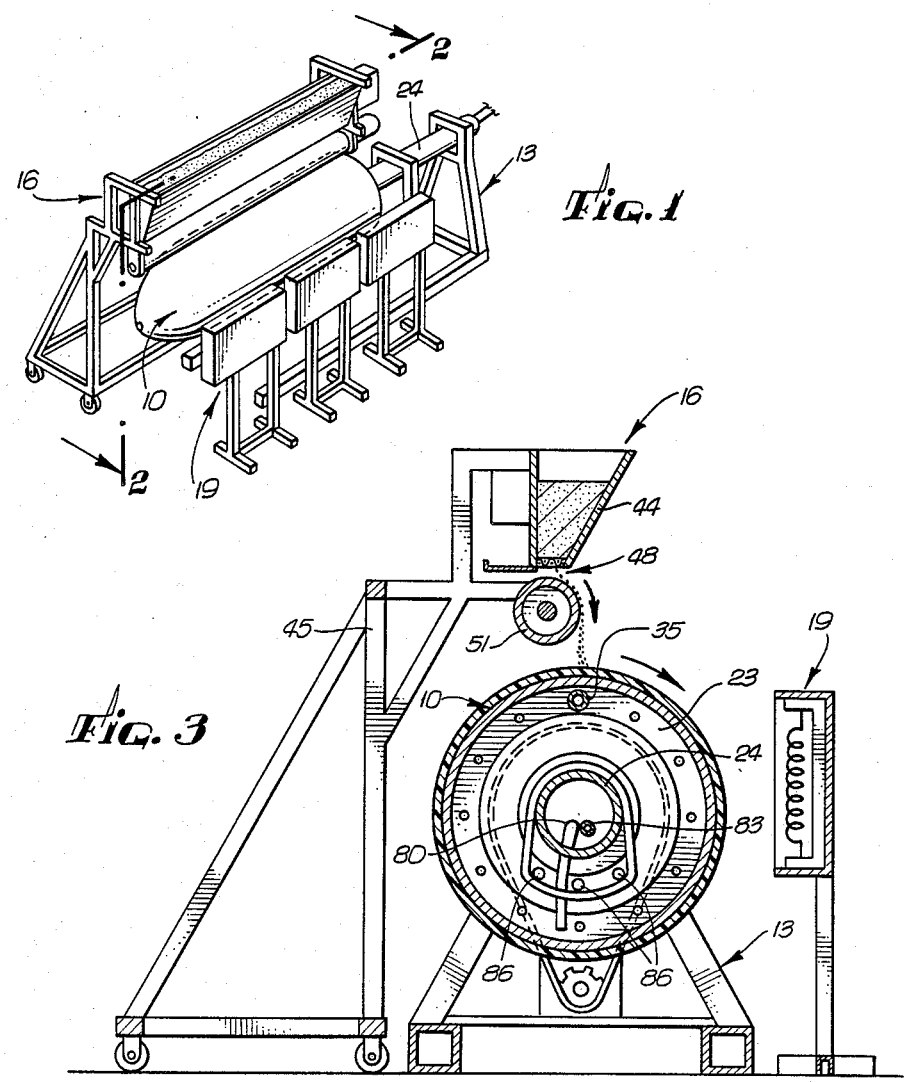
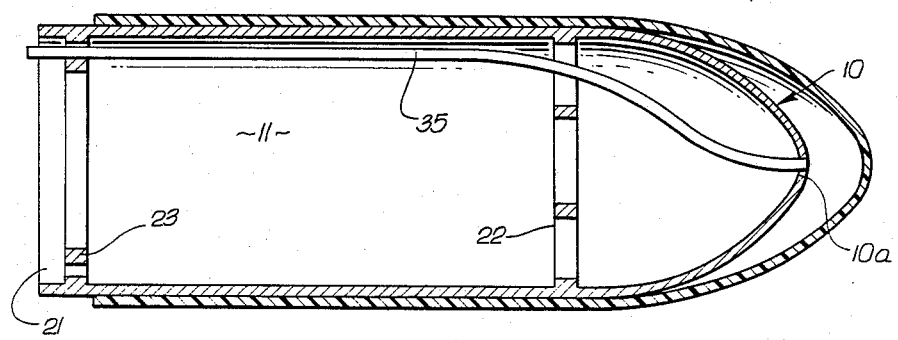

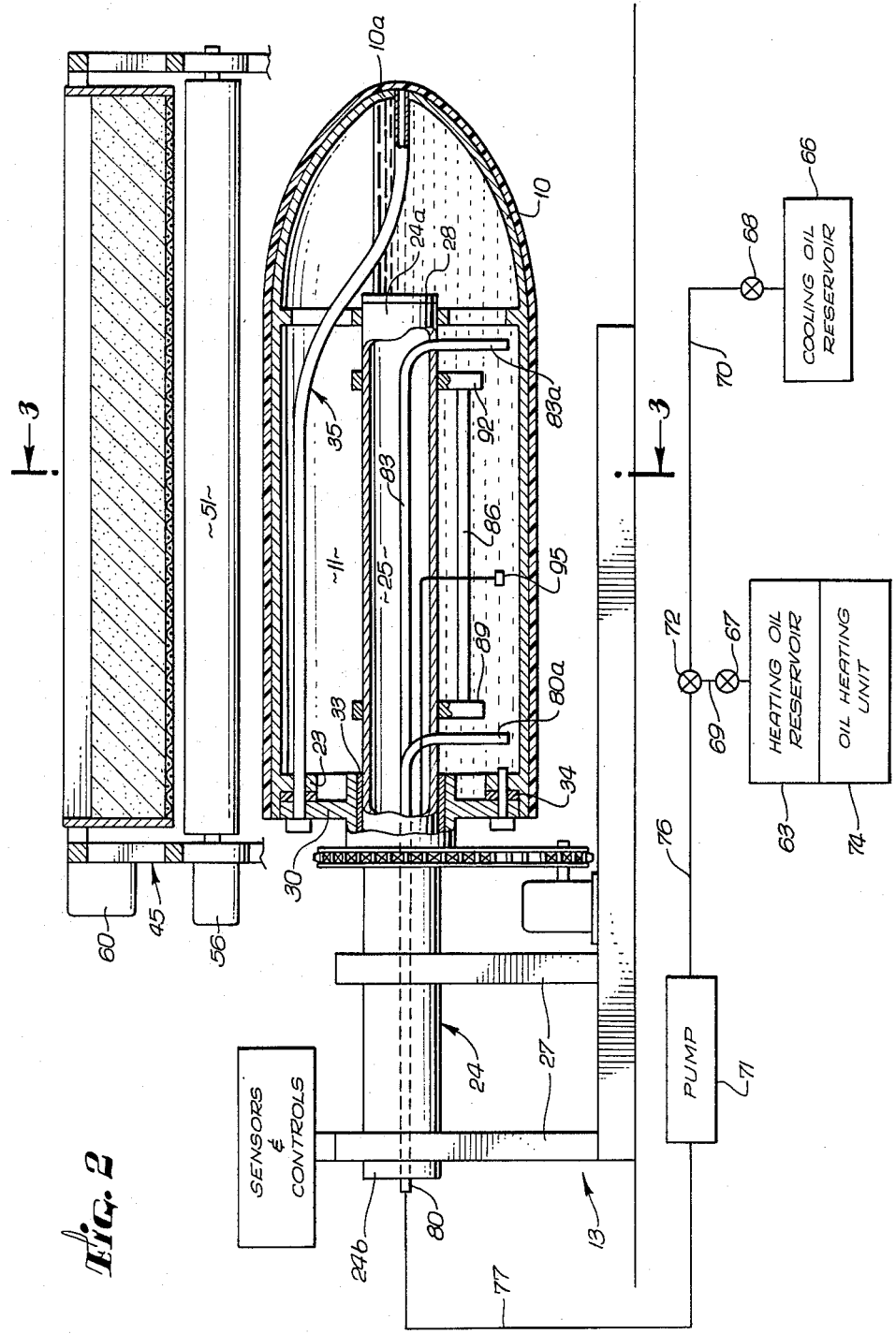

PROCESS AND APPARATUS FOR FORMING HOLLOW STRUCTURES FROM POWDERED THERMOPLASTIC MATERIALS

BACKGROUND OF THE INVENTION

1. Field of the Invention

The present invention concerns a process for fabricating hollow structures by depositing a thermoplastic material in powdered form on an exterior surface of a mold form and an apparatus for carrying out this process.

2. Description of the Prior Art

Hollow structures such as noncorroding fluid container liners have previously been formed from a variety of thermoplastic materials, such as polyethylene, polypropylene, nylon, Celcon, and Hytrel. One method of fabrication, called the "roto-casting" process, involves placing a predetermined quantity of thermoplastic material in powdered form inside a split-mold, inserting the mold and powdered thermoplastic material combination into an oven and rotating the combination about one or more axes at a temperature approximately the same as the melting temperature of the powdered thermoplastic material. The powdered thermoplastic material splashes freely within the mold and adhers to the inner surface of the mold as the surface temperature approaches the melting point of the thermoplastic material. The mold is removed from the oven after the thermoplastic material has been deposited over the entire inner surface of the mold and the resulting structure is removed from the interior of the mold when cooled.

This process, however, suffers from a number of disadvantages. Chief among these is an inability to control the wall thickness of the resulting thermoplastic material structure. Pinholes often occur in portions of the resulting structure due to poor distribution of the thermoplastic material within the mold during the heated rotation step. Alternatively, excessively thick and heavy structures result from attempting to achieve a minimum wall thickness over the entire surface of the structure. In addition, the interior surface of the resulting structure commonly has a rough or uneven surface. This rough surface can cause problems with fluid purging procedures when the resulting thermoplastic structure is used as a fluid container. It is also commonly difficult to adhesively bond most of the thermoplastic materials best suited for use as fluid container liners due to their noncorrosive characteristics. This bonding problem can be further exacerbated by an often necessary practice of coating the inside of a roto-cast mold with a release agent before inserting the powdered thermoplastic material. Because of this bonding problem, difficulties are frequently encountered in fabricating a fluid container having an exterior shell bonded to an inner liner formed from thermoplastic materials by the roto-casting process.

Attempts have been made to avoid the problems encountered in practicing the roto-casting process. One process, described in U.S. Pat. No. 3,009,209, involves spraying a liquid reactive mixture capable of forming a solid polyurethane plastic onto a rotating mandrel form. While permitting a more careful monitoring of wall thickness, this process is limited to liquid reactive materials which can be spray deposited through an aerosol nozzle onto a mandrel form while still in a liquid state. Similarly, a process described in U.S. Pat. No. 3,379,591 involves forming tubular articles by spray depositing resin-glass compositions and incorporating cut lengths of filament roving onto a rotating mandrel form. This process is also limited to those resin-glass compositions which can be deposited from an aerosol nozzle while still in a liquid state.

Thus, there exists a need for a process for forming hollow structures from a powdered thermoplastic material permitting careful monitoring of the wall thickness during fabrication. There further exists a need for a process for forming a hollow structure from powdered thermoplastic plastic materials to which external container shells and the like can be more easily bonded and which have a relatively smooth inner wall. In addition, there exists a need for an apparatus by which this process can be practiced.

SUMMARY OF THE INVENTION

It is therefore an objective of the present invention to provide a process for forming hollow structures by depositing thermoplastic materials in powdered form on an exterior surface of a heated mold form. It is a further objective to provide a process in which the deposition of powdered thermoplastic materials can be monitored to carefully control the wall thickness of the resulting structure and avoid localized areas of pinhole permeability in the resulting structure without resorting to heavier structures having unnecessarily thick walls. It is a further objective of the present invention to provide a process for producing from powdered thermoplastic materials hollow structures with relatively smooth inner walls. Still another objective of the present invention is to provide a process by which powdered thermoplastic materials having corrosion-resistant characteristics can be used to form hollow structures which can be easily bonded to other articles.

To accomplish the foregoing and other objectives and advantages, the present invention provides a process wherein a hollow mold form is coated with a commercially available release agent and heated. The mold form is then heated to approximately the melting point of the thermoplastic material to be deposited. The mold form is then continuously rotated as a predetermined quantity of powdered thermoplastic material is sprinkled over the exterior surface of the mold form. The deposition rate, temperature, and rate of rotation are coordinated to achieve the deposition of a semi-molten layer of thermoplastic material having a predetermined thickness. The deposition step continues until a plurality of semi-molten layers have been built up on the mold form having a composite thickness approximately the same as the desired resulting structure.

In the preferred embodiment of the present inventive process, an adhesively bindable material is then sprinkled over the semi-molten outer layer. The mold form is subsequently cooled to a lower temperature and an edge of the resulting thermoplastic material structure trimmed to form a uniform edge. The mold form is then further cooled and the resulting structure removed from the mold form by introducing pressurized air between the resulting structure and the mold form.

The preferred embodiment of the present invention further comprises an apparatus for practicing the above-inventive process. This apparatus includes a hollow mold form open at one end and rotatingly coupled to a support structure, a means for heating the mold form, and an apparatus, removably disposed above the mold form, for dispensing powdered thermoplastic material.

The dispensing apparatus is composed of a hopper containing a powdered thermoplastic material, a gate attached to the bottom of the hopper, and a rotating dispensing cylinder driven by a suitable variable speed drive. Both elements are attached to a support form independent of the mold form support structure. The dispensing apparatus support form may be vibrated to assist in the even distribution of powdered thermoplastic material over the mold form.

The support structure for the mold form includes a hollow cylinder partially disposed within the mold form and a suitable structure for physically supporting this hollow cylinder. The cylinder is open at an exposed end outside the mold form and sealed off at the opposing end disposed within the mold form. A fluid-tight bushing is disposed about and sealed to the hollow cylinder and a bulkhead similarly disposed about and sealed to this bushing. The bulkhead is attached to the mold form at the open end of the ladder thus enclosing the space within the mold form.

The mold form is heated by heating a fluid, such as oil, to a temperature approximately twice the melting temperature of the thermoplastic material to be used. This fluid is introduced into the enclosed volume within the mold form through pipes disposed within the hollow supporting cylinder. Internal heating elements disposed adjacent and coupled to the hollow supporting cylinder maintain the temperature of the heated fluid. External radiant energy heaters disposed about the mold form provide supplemental heating. Thermocouples are disposed within the mold form, attached to the hollow supporting cylinder, to assist in temperature management. After the thermoplastic material has been satisfactorlly deposited on the exterior of the mold form, the internal and external heating elements are turned off, the heated fluid removed from the mold form, and a quantity of the same or a similar fluid at approximately room temperature is introduced into the mold form to begin cooling the mold form.

After cooling, the resultant thermoplastic structure is removed from the mold form by introducing air between the mold form and the resulting structure through a tube disposed within the mold form which extends through both the bulkhead and the tip of the mold form.

The novel features which are believed to be characteristic of the invention, together with further objectives an advantages thereof, will be better understood from the following description considered in connection with the accompanying drawings in which a presently preferred embodiment is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of an illustrative embodiment of the apparatus for carrying out the inventive process for forming hollow structures from powdered thermoplastic materials;

FIG. 2 is a cutaway side view of the mold form, support structure, heating and cooling means, and dispensing apparatus shown in FIG. 1;

FIG. 3 is a cutaway end view of the mold form and dispensing apparatus also shown in FIGS. 1 and 2.

FIG. 4 is a cutaway side view of the mold form used in the apparatus of FIG. 1.

DETAILED DESCRIPTION

Referring now to the drawings, and more particularly FIG. 1 thereof, there is shown a preferred embodiment of the inventive apparatus for forming hollow structures from powdered thermosetting materials. The major elements of this apparatus include a hollow mold form 10 rotatably coupled to a support structure 13. A dispensing system, generally designated as 16, is removably disposed above and to one side of the mold form 10. Auxiliary external heating devices 19, typically radiant heaters, are disposed on the opposing side of the mold form 10.

As shown in FIGS. 2 and 4, the mold form 10 has a hollow interior 11 communicating with an aperture 21 at one end. A forward support member 22 is disposed within the mold form 10 towards the closed portion of the mold form 10. An attachment ring 23 is connected to the inside surface of the mold form 10 adjacent the aperture 21.

The particular shape of the mold form 10 is derived from the desired shape of the structure being manufactured. The shape of the resulting structure manufactured using the mold form 10 illustrated in FIGS. 2 and 4 is intended for use as an external fuel tank for an aircraft or helicopter. The mold form 10 illustrated in FIGS. 2 and 4 therefore has a generally aerodynamic shape approximately corresponding to the desired shape of an external aviation fuel tank. Structures having other shapes could also be formed by the process of the present invention. The particular shape of the mold form employed in the preferred embodiment is, therefore, illustrative only and should not be interpreted as a limitation.

As shown in FIG. 3, the support structure 13 of the present invention includes a nonrotating hollow support beam 24 connected to a support frame 27. When the mold form 10 is rotatably mounted to the support structure 13 (as shown in FIG. 2), a portion of the hollow support beam 24 is disposed within the mold form 10. The end portion 24a of the hollow support beam 24 disposed within the mold form 10 is sealed off by a cap 28. The opposing end portion 24b of the hollow support beam 24 has an aperture opening to the interior 25 of the hollow support beam 24. Thus, the hollow support beam 24 defines a stationary conduit into the interior cavity 11 of the mold form 10.

The mold form 10 is rotatably mounted to the support structure 13 by being connected to a bulkhead 30 which is disposed about and sealingly attached to a fluid-tight bushing 33, which is in turn disposed about and similarly sealingly connected to the hollow support beam 24. A high temperature gasket 34 is disposed between the mold form 10 and the bulkhead 30 to provide a fluid-tight seal. The mold form 10 may be connected to the bulkhead 30 by bolts passing through the bulkhead 30 and engaging the attachment ring 23, or by any other convenient fastening means.

To facilitate subsequent removal of a thermoplastic structure from the exterior surface of mold form 10 an air tube 35 is disposed along the interior surface of the mold form 10. One end of the air tube 35 penetrates through the enclosed tip 10a of the mold form 10 while an opposite end of the air tube 35 is connected to and sealingly passes through the bulkhead 30.

Rotation of the mold form 10 is effectuated by a variable-speed motor 36 connected to the support frame 27 and engaging a sprocket wheel 39 by means of a chain 41. The sprocket wheel 39 is attached to the bulkhead 30.

The dispensing system 16 (FIGS. 2 and 3) includes a thermoplastic material reservoir, or hopper 44 connected to a support frame 45. The bottom of the hopper 44 defines an aperature to which a gate 48 is attached. This gate 48 permits a controlled quantity of thermoplastic material to fall through the bottom of the hopper 44 thereby controlling the rate of deposition of thermoplastic material onto the surface of the mold form 10.

A dispensing cylinder 51 is rotatingly mounted to the support frame 45 and disposed directly below the hopper 44. The dispensing cylinder 51 extends along almost the entire length of the mold form 10. In the presently preferred embodiment of the present invention the dispensing cylinder 51 has a smooth surface. A knurled or otherwise roughened surface should, however, assist in providing a more uniform deposition of thermoplastic material onto the mold form 10. Alternatively the dispensing cylinder 51 may have a surface made of some form of rubberized material to further effectuate a more uniform deposition of powdered thermoplastic material.

Rotation of the dispensing cylinder 51 is effectuated by a second variable-speed motor 56, connected to the support frame 45, engaging a standard "v-belt" drive belt and gear connected to the dispensing cylinder 51. A vibrating mechanism 60 for vibrating the hopper 44 and dispensing cylinder 51 is also attached to the frame 45. As shown in FIG. 3, the support frame 45 has an offset geometry to permit the hopper 44 and dispensing cylinder 51 to be placed directly over the mold form 10.

For material dispensing the vibrating mechanism 60 and variable-drive motor 56 are activated and a limited quantity of thermoplastic material sifted through the gate 48 to fall onto the now rotating dispensing cylinder 51. As the dispensing cylinder 51 rotates, a uniform stream of thermoplastic material is deposited onto the top of the mold form 10. The density of the thermoplastic material stream and consequently the rate of deposit of thermosetting material onto the mold form 10 is governed by the size of the opening at the bottom of the hopper 44 as regulated by the gate 48. It has been found that the combination of a hopper spilling a limited quantity of thermoplastic material onto a rotating dispensing cylinder provides a more uniform distribution of thermoplastic material onto the mold form 10 than a hopper alone.

The mold form 10 of the present invention is heated to about twice the melting temperature of a thermoplastic material by introducing a heated fluid into the cavity 11 of the mold form 10. Typically oil having a flash point of 550° Fahrenheit or higher is used. Any fluid having a boiling temperature and/or ignition temperature greater than twice the melting temperature of the thermoplastic plastic could alternatively be used for heating. The same type of oil is used for both the heating and cooling.

As shown in FIG. 2, the heating system of the present invention includes a heating fluid reservoir 63 and a separate cooling fluid reservoir 66 connected by appropriate plumbing to a high temperature reversible fluid pump 71. An exterior heat source 74 is used to heat the oil within the heating reservoir 63. This heat source 74 may be incorporated into the reservoir if desired. For example, insulated electrical heating elements may be disposed within the reservoir 63. Alternatively, devices such as commercial oil boilers could be employed.

In the presently preferred embodiment of the invention, the heated oil reservior 63 and cooling fluid reservior 66 are respectively connected to separate two-position "on-off" type valves 67 and 68. Pipe segments 69 and 70 extend respectively from the "off-on" valves 67 and 68 to alternative inputs of an alternatively selective "T-valve" 72 the output of which is in turn connected to the reversible pump 71 via pipe segment 76. From the pump 71, heated or cool oil is communicated to the interior cavity 11 of the mold form 10 via a pipe segment 77 connected to a pipe segment 80 disposed within the interior 25 of the hollow support beam 24 and passing through the opening at the hollow support beam end 24b. The pipe segment 80 includes a lateral section 80a which passes through the bottom of the hollow support beam 24 within the cavity of the mold form 10. A fluid-tight seal is formed between the pipe section 80a and the hollow support beam 24. The pipe section 80a descends towards but does not contact the bottom inner surface of the mold form 10.

A second pipe segment 83 is also disposed within the interior 25 of the hollow support beam 24 similarly passing through the opening at the hollow support beam end 24b. Pipe segment 83 also includes a lateral section 83a which passes through the bottom of the hollow support beam 24 descending towards but not contacting the bottom inner surface of the mold form 10. Pipe segments 80a and 83a are generally disposed near opposing ends of the enclosed portion of the hollow support beam 24. In the presently preferred embodiment invention heated oil is heated exteriorly and then inserted into the interior 11 of the mold form 10. Internal heating elements 86 are then employed to maintain the elevated temperature of the heated oil. In this presently preferred embodiment pipe segment 83 is capped off at an end adjacent the hollow support beam end 24b. In an alternative embodiment, however, the heated oil could be circulated through the interior 11 of the mold form 10 with the elevated temperature of the heated oil further augmented by an externally located commercially available heating source. In this alternaive embodiment, pipe segments 80 and 83 would serve as input and output means for the circulating heated oil.

As shown in FIGS. 2 and 3, several internal heating elements 86 are disposed within the cavity of the mold form 10 directly below the hollow support beam 24. The internal heating elements 86 are connected to two interface boxes 89 and 92 which are sealingly connected to the hollow support beam 24. These interface boxes 89 and 92 provide fluid-tight seals around the internal heating elements 86 and electrical cables passing through the hollow support beam 24 to energize the internal heating units 86.

As mentioned above, in the preferred embodiment internal heating elements 86 are used to maintain the temperature of a heated oil disposed within the cavity 11 of the mold form 10. Several external heating units 19 are disposed along one side of the mold form 10 to supplement the internal heating of the mold form 10 and to maintain the exterior surface of the mold form 10 at a uniform temperature. Heating units 19 are typically radiant heaters.

Internal thermocouples 95 are used to monitor the interior tempeature of the mold form 10. As shown in FIG. 2, these thermocouples descend from the bottom portion of the hollow support beam 24 towards the inner surface of the mold form 10. The thermocouples 95 penetrate through the hollow support beam 24 via fluid-tight seals.

The oil within the heating fluid reservoir 63 is heated to a temperature about twice the melting temperature of the thermoplastic material to be used. The "off-on" type valve 67 is opened and alternatively selective "T-valve" 72 turned to place the reversible pump 71 in communication with the heating fluid reservoir 63. A quantity of heated oil is then transferred by the pump 71 to the interior cavity of the mold form 10 through pipe segment 80. Internal heating elements 86 and auxiliary heating devices 19 are then activated.

When the mold form 10 is to be cooled, the internal heating elements 86 and auxiliary heating devices 19 are deactivated and the pump 71 activated in a reverse mode to remove the heated oil from the interior of the mold form 10. Valve 67 is then closed, valve 68 opened and the alternatively selective "T-valve" 72 turned to place the reversible pump 71 in communication with the cooling fluid reservoir 66. Cool oil, typically at room temperature, is then pumped into the cavity 11 of the mold form 10. This process reduces the temperature of the mold form 10 to approximately the solidifying temperature of the thermoplastic material to be used. Thereafter, the mold form 10 is allowed to cool to room temperature without introducing additional cool oil.

As discussed above the mold form 10 could alternatively be heated and maintained at an elevated temperature by circulating the heated oil through the cavity of the mold form 10 and an exterior heat source. Cool oil could be similarly circulated to facilitate cooling of the mold form 10. If more rapid cooling were desired, the cool oil could be circulated through an external refrigeration unit or a waste heat exchange unit.

Having described the inventive apparatus used to practice the process of the present invention, the process will now be detailed.

Thermoplastic materials are normally produced for industrial purposes as pellets, typically having a ⅛" diameter and a ⅛" length. Powdered thermoplastic materials are formed by grinding or milling these pellets into a powder having a consistency generally similar to course flour. Numerous thermoplastic materials in powder form can be used with the process of the present invention. Useful materials include "NYLON 6/6" (a trademark) and "HYTREL" (a trademark).

A hollow structure is formed from a powdered thermoplastic material by first coating the exterior surface of the mold form 10 with a conventional release agent such as "RELEASE ALL 30" (a trademark) or "RELEASE ALL 50" (a trademark). After coating the mold form 10, the oil residing within the heating fluid reservoir 63 is heated, typically, to a temperature about twice the melting temperature of the thermoplastic plastic to be used. This process has been performed by heating the oil within the heating fluid reservoir to a temperature of approximately 500° Fahrenheit when used with thermoplastic materials melting at about 250° Fahrenheit.

After heating the oil in the heating fluid reservoir 63 to approximately 500° Fahrenheit, valve 67 is opened and alternatively selective "T-valve" 72 turned to communicate heating fluid reservoir 63 with the pump 71. The pump 71 is then activated in a forward mode and heated oil is transferred into the interior of the mold form 10. Typically 50 to 75 gallons of heated oil is used to heat the mold form 10 of the preferred embodiment which has a diameter of about 2.5 feet and a length of about 5 feet. The internal heating elements 86 are then activated to maintain the temperature of the heated oil. The auxiliary external heating devices 19 are also activated to maintain the exterior surface of the mold form 10 at a uniform temperature. Typically the internal temperature of the mold form is maintained at about 500° Fahrenheit and the external temperature of the mold form maintained at about 425° Fahrenheit. Continuous rotation of the mold form, typically at a rate of 1–3 revolutions per minute, is then initiated using the motor 36 and the powdered thermoplastic material dispensing system 16 is placed over the rotating mold form 10. The dispensing system 16 is then activated as described above and a predetermined quantity of powdered thermoplastic material deposited on the exterior surface of the mold form 10 along the entire length thereof.

In using thermoplastic materials such as "NYLON 6/6" (a trademark) or "HYTREL" (a trademark), good results have been obtained when the quantity of thermoplastic material deposited on the exterior surface of the mold form 10, in conjunction with the rotation of the mold form 10 at a rate of 1–3 revolutions per minute, produces a layer approximately 0.002"–0.005" thick during each revolution. The deposition of powdered thermoplastic material is continuously performed until the cumulatively deposited layers build up to a composite thickness of approximately 0.020"–0.030" inches. Deposition of the powdered thermoplastic material is then stopped. While the dispensing system 16 provides a generally uniform deposition of thermoplastic material onto the exterior surface of the mold form 10, the resulting composite layers may be examined at this point and, if necessary, additional thermoplastic material may be selectively deposited onto any areas of apparent sub-minimal thickness.

To substantially assist the adhesive bonding characteristics of the resulting structure, the surface of the molten thermoplastic material structure is then covered with a material having better adhesive bonding characteristics. Typical of the materials that can be used are glass or graphite fibers, milled fibers, or microballoons. Milled fiberglass fibers have been successfully used.

After covering the surface of the molten structure with a more adhesively bondable compound, the auxiliary external heating devices 19 and internal heating elements 86 are deactivated. The pump 71 is then reversed to remove virtually all of the heated oil from the interior of the mold form 10. The valve 67 is then closed, valve 68 opened and alternatively selective "T-valve" 72 turned to communicate the cold fluid reservoir 66 with the pump 71. The pump 71 is again activated in the forward mode and room temperature cool fluid, typically the same type of oil as used for heating, is pumped into the interior of the mold form 10. Cool oil is pumped into the interior of the mold form 10 until the interior temperature has dropped to approximately 250° Fahrenheit. Thermosetting materials such as "NYLON 6/6" (a trademark) and "HYTREL" (a trademark) adhering to the exterior of the mold form usually solidify at approximately 250° Fahrenheit. The edge of the solidified structure adjacent the bulkhead 30 is then trimmed to produce a straight edge. The mold form 10 and resulting structure are then allowed to cool further and the resulting structure subsequently removed from the mold form 10.

Pressurized air is introduced into the tube 35 communicating with the exterior tip of the mold form 10 to facilitate removal of the resulting structure. Alternatively, pressurized air may be directed along the trimmed edge of the resulting structure to effectuate removal.

Those skilled in the art will perceive other variations and modifications in the above-described process and apparatus to practice said process, within the spirit and scope of the invention. It will also be understood that the invention is not limited to the particular shape of the mold form 10 as above described, but that the invention is adaptable for use with mold forms of other geometries. Therefore, the invention is not limited to the preferred embodiment herein described, the scope of the invention being defined by the appended claims.

What is claimed is:

1. A method for forming a hollow structure, comprising:
   a. heating and rotating a mold;
   b. depositing powdered thermoplastic material onto the outer surface of said heated rotating mold to form on said outer surface a semi-molten layer of said thermoplastic material; and
   c. depositing an adhesively bindable material onto the outer surface of said semi-molten thermoplastic layer, said material consisting of glass or graphite fibers or microballoons, said bindable material enhancing the adhesive bonding characteristics of the resultant structure.

2. The method of claim 1 wherein step c is continued until a plurality of layers having a composite thickness to length ratio of approximately one to two thousand have been deposited on said rotating heated mold.

3. A method for forming a hollow structure from a powdered thermoplastic material, comprising the steps of:
   a. applying a coating of release agent to a mold form and heating the mold form to at least the melting point of said thermoplastic material;
   b. rotating said heated mold form;
   c. sprinkling said powdered thermoplastic material onto the exterior of said heated rotating mold form to form a semi-molten layer of said material on said mold;
   d. inspecting said layer of material for defects while still in the semi-molten state and correcting such defects by selectively adding additional powdered thermoplastic material in the defect areas;
   e. sprinkling an adhesively bindable material onto the outer surface of said semi-molten layer, said material consisting of glass or graphite fibers or microballoons;
   f. cooling said mold form to effectuate hardening of said layer; and
   g. removing the resulting formed hollow structure from said mold form.

* * * * *